United States Patent
Caltabiano

(10) Patent No.: US 11,054,319 B2
(45) Date of Patent: *Jul. 6, 2021

(54) STRAIN GAUGE WITH MECHANICALLY DECOUPLED TEMPERATURE SENSOR

(71) Applicant: STMicroelectronics S.r.l., Agrate Brianza (IT)

(72) Inventor: Daniele Caltabiano, Agrate Brianza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,276

(22) Filed: Sep. 11, 2020

(65) Prior Publication Data

US 2020/0408621 A1 Dec. 31, 2020

Related U.S. Application Data

(63) Continuation of application No. 15/899,204, filed on Feb. 19, 2018, now Pat. No. 10,782,196.

(51) Int. Cl.
| | |
|---|---|
| G01L 1/22 | (2006.01) |
| G01B 7/16 | (2006.01) |
| G01D 5/16 | (2006.01) |
| G01L 1/04 | (2006.01) |
| G01L 1/06 | (2006.01) |
| G01L 1/18 | (2006.01) |
| G01L 19/00 | (2006.01) |
| G01L 9/04 | (2006.01) |
| G01L 9/00 | (2006.01) |

(52) U.S. Cl.
CPC .............. G01L 1/2281 (2013.01); G01B 7/22 (2013.01); G01D 5/16 (2013.01); G01L 1/04 (2013.01); G01L 1/06 (2013.01); G01L 1/18 (2013.01); G01L 1/2293 (2013.01); G01L 9/0042 (2013.01); G01L 9/0054 (2013.01); G01L 9/045 (2013.01); G01L 19/0092 (2013.01)

(58) Field of Classification Search
CPC . G01L 1/2281; G01L 1/04; G01L 1/06; G01L 1/18; G01L 1/2293; G01L 9/0042; G01L 9/0054; G01L 9/045; G01L 19/0092; G01B 7/22; G01D 5/16
USPC ........................................................ 257/417
See application file for complete search history.

(56) References Cited

U.S. PATENT DOCUMENTS

| | | | |
|---|---|---|---|
| 4,522,072 A | 6/1985 | Sulouff et al. | |
| 4,951,510 A | 8/1990 | Holm-Kennedy et al. | |
| 4,990,986 A * | 2/1991 | Murakami | G01P 15/0802 |
| | | | 257/419 |
| 2004/0168519 A1 | 9/2004 | Kalvensten et al. | |
| 2006/0076947 A1* | 4/2006 | Berkcan | G01R 15/148 |
| | | | 324/126 |

OTHER PUBLICATIONS

Partial European Search Report, Application EP 19 15 8156, dated Jul. 16, 2019, 12 pages.

* cited by examiner

*Primary Examiner* — Hrayr A Sayadian
(74) *Attorney, Agent, or Firm* — Slater Matsil, LLP

(57) ABSTRACT

A semiconductor device includes a strain gauge on a substrate, the strain gauge configured to measure a stress of the substrate; and a temperature sensor disposed within the substrate, the temperature sensor being decoupled from the stress of the substrate.

20 Claims, 14 Drawing Sheets

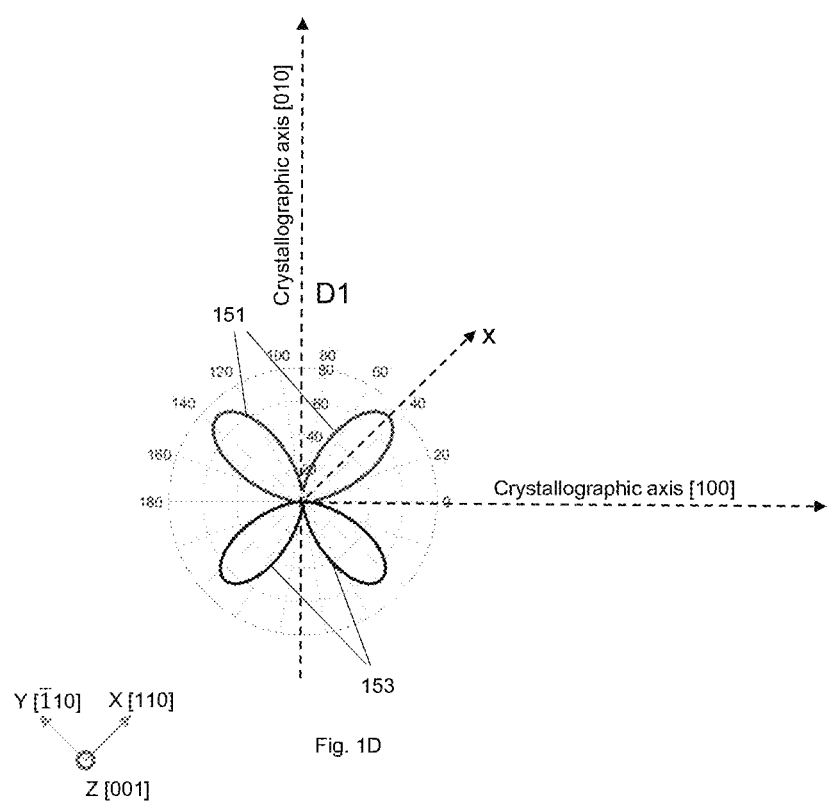

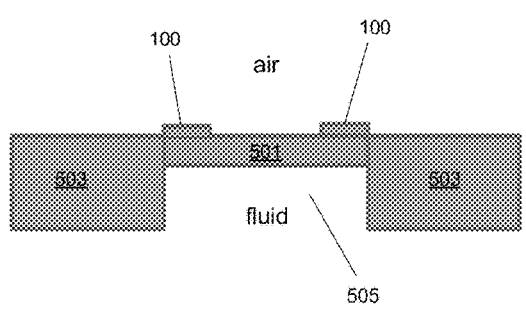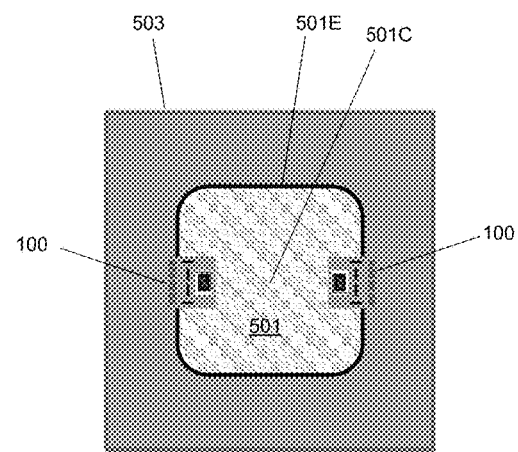
Fig. 5A
Fig. 5B

700

STRAIN GAUGE WITH MECHANICALLY DECOUPLED TEMPERATURE SENSOR

PRIORITY CLAIM AND CROSS-REFERENCE

This application is a continuation of U.S. patent application Ser. No. 15/899,204, filed on Feb. 19, 2018, and entitled "Strain Gauge with Mechanically Decoupled Temperature Sensor," which application is incorporated herein by reference.

TECHNICAL FIELD

The present invention relates generally to systems and methods for strain gauges, and, in particular embodiments, to semiconductor strain gauges with temperature compensation.

BACKGROUND

Strain gauges are often used to sense stress (e.g., pressure, force, torque) in a subject material. The strain gauge has a strain sensing element that is attached or adhered to the subject material. When the subject material is strained, the resistance of the sensing element changes in proportion to the strain it experiences. The change in resistance in the sensing element as it is deformed (e.g., compressed or elongated) is measured and used to calculate strain in the subject material. Foil strain gauges, which have a metal sensing element, are often used to measure strain. However, metal sensing elements have a relatively low gauge factor, which reduces the sensitivity of the gauge. Semiconductor strain gauges, through the use of semiconductor material (e.g., doped single crystal silicon or polycrystalline silicon) as the sensing element, increases the gauge factor of the strain gauge dramatically. The increased gauge factor, together with the small form factor and high integration density, has resulted in the popularity of semiconductor strain gauges in various applications across different industries.

SUMMARY

In some embodiments, a semiconductor device includes a strain gauge on a substrate, the strain gauge configured to measure a stress of the substrate; and a temperature sensor disposed within the substrate, the temperature sensor being decoupled from the stress of the substrate.

In some embodiments, a semiconductor device includes a frame having a semiconductor material, the frame surrounding a cavity in the frame; and a temperature sensor disposed in the cavity and being elastically attached to the frame by a spring having the semiconductor material.

In some embodiments, a method of operating a stress sensor includes measuring a temperature of a substrate using a temperature sensor to obtain an uncalibrated temperature value; measuring a stress of the substrate using a strain gauge to obtain an uncalibrated stress value, the stress sensor including the strain gauge and the temperature sensor, the strain gauge being integrated on the substrate, the temperature sensor being decoupled from the stress of the substrate; converting the uncalibrated temperature value into a calibrated temperature value; and converting the uncalibrated stress value into a calibrated stress value using the calibrated temperature value.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be re-described in the interest of brevity. For a more complete understanding of the invention, reference is now made to the following descriptions taken in conjunction with the accompanying drawings, in which:

FIG. 1D is a polar plot illustrating the piezoresistivity coefficients of a semiconductor resistor, in some embodiments;

FIGS. 5A and 5B illustrate a cross-sectional view and a top view, respectively, of a system for measuring a pressure, in some embodiments;

DETAILED DESCRIPTION OF ILLUSTRATIVE EMBODIMENTS

Figure 1A:
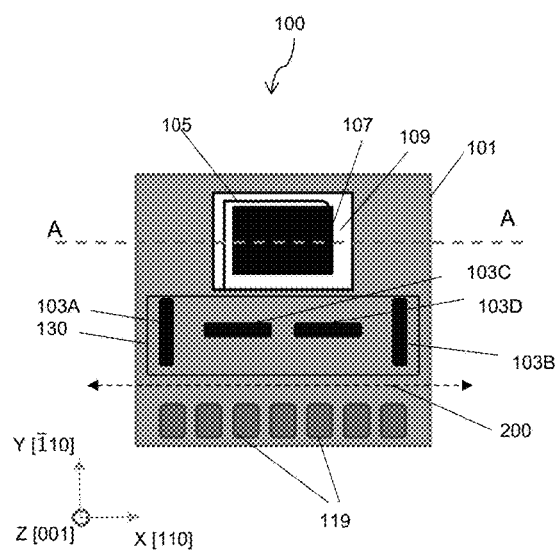
FIG. 1A illustrate a plan view of a semiconductor device, in some embodiments.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a semiconductor device with a strain gauges and a temperature sensor integrated together (e.g., on a same semiconductor die).

Semiconductor strain gauges are widely used as stress sensors to measure, e.g., pressure, force, or torque. Compared with metal strain gauges, semiconductor strain gauges have the advantage of increased sensitivity (e.g., increased gauge factor). However, semiconductor strain gauges are sensitive to temperature change, and the output of semiconductor strain gauges may exhibit a thermal drift (e.g., change) as the temperature changes, even when the stress to be measured remains unchanged, thereby limiting the accuracy of semiconductor strain gauges. A large part of thermal drift of sensors based on semiconductor strain gauges may be attributed to the differences in the coefficients of thermal expansion (CTEs) of the different materials used in the sensors. For example, due to an increase of temperature, a substrate may expand more than the semiconductor strain gauge, causing the semiconductor strain gauge to be expanded. In general, the mismatch of the CTEs causes internal stress which may vary with the temperature, and the internal stress in turn affects the sensing bridge of the semiconductor strain gauge, thereby causing an unwanted output proportional to the temperature.

To remove or reduce the thermal drift, a temperature sensor is sometimes integrated with the semiconductor strain gauge. The measured temperature from the temperature sensor is then used to compensate the thermal drift using, e.g., equations, curves, or look-up tables generated based on the physical characteristics of the semiconductor strain gauge, therefore increasing the accuracy of the semiconductor strain gauge over the operating temperature range. However, the temperature sensing element (e.g., a thermal bridge) of a temperature sensor may also be affected by the mechanical stress to be measured. For example, when the temperature sensor is subjected to the stress to be measured, the resistors in the thermal bridge of the temperature sensor may change their resistance in response to the stress. Therefore, without proper mechanical decoupling between the temperature sensor and the semiconductor strain gauge, the output of the temperature sensor may also have an unwanted component that is stress dependent, and thus, resulting in inaccurate measurement of the temperature. The inaccurate measurement of the temperature may reduce the effectiveness of the temperature compensation of the thermal drift.

Embodiments of the present disclosure decouple the temperature sensor from the stress exerted on the semiconductor strain gauge. In an embodiment, the temperature sensor is suspended by a spring (e.g., a silicon spring) and is physically separated from a substrate of the semiconductor strain gauge (e.g., a substrate the semiconductor strain gauge is formed on). As a result, the temperature sensor is mechanically decoupled from the substrate, and the output of the temperature sensor is not affected by the stress in the substrate. Therefore, the temperature sensor described in the present disclosure provides an improved measurement of the temperature that is independent of the stress. The improved measurement by the temperature sensor is then used to provide better temperature compensation to remove the thermal drift of the semiconductor strain gauge.

FIG. 1A illustrates a plan view of a semiconductor device 100 comprising a semiconductor strain gauge 130 and a temperature sensor 107. As illustrated in FIG. 1A, the semiconductor strain gauge 130 is formed in and/or on a substrate 101. The temperature sensor 107 is disposed in an opening 109 of the substrate 101, and is suspended from the substrate 101 by a silicon spring 105, in the illustrated example. In other words, the temperature sensor 107 is attached to the substrate 101 through the silicon spring 105, and is physically separated from the substrate 101. Conductive pads 119, such as copper pads, are formed on the substrate 101, and are electrically coupled to other circuits and/or components (e.g., temperature sensor 107, silicon strain gauge 130) of the semiconductor device 100. The conductive pads 119 may also provide the input/output ports (I/O ports) for the semiconductor device 100. In the present disclosure, the substrate 101 may also be referred to as a frame to which the temperature sensor 107 is attached.

The substrate 101 may comprise silicon, doped or undoped, or an active layer of a semiconductor-on-insulator (SOI) substrate. The substrate 101 may include other semiconductor materials, such as germanium; a compound semiconductor including silicon carbide, gallium arsenic, gallium phosphide, gallium nitride, indium phosphide, indium arsenide, and/or indium antimonide; an alloy semiconductor including SiGe, GaAsP, AlInAs, AlGaAs, GaInAs, GaInP, and/or GaInAsP; or combinations thereof. Other substrates, such as multi-layered or gradient substrates, may also be used. Devices, such as transistors, diodes, capacitors, resistors, etc., may be formed in and/or on the substrate 101 and may be interconnected by interconnect structures formed by, for example, metallization patterns in one or more dielectric layers over the semiconductor substrate 101 to form functional circuits.

FIG. 1A illustrates the semiconductor strain gauge 130, which comprises, among other devices, four resistors 103 (e.g., 103A, 103B, 103C, 103D) such as silicon piezoresistors. For clarity, not all of the devices of the semiconductor strain gauge 130 are illustrated. In the illustrated embodiment, the resistors 103 are silicon piezoresistors, and are electrically connected in a Wheatstone bridge (see, e.g., FIG. 2) configuration to form a sensing bridge of the semiconductor strain gauge 130. In some embodiments, the four resistors 103 of the sensing bridge are of the same type of semiconductor resistors (e.g., n-type transistors or p-type transistors). The sensing bridge is used to measure a stress applied to the resistors 103, e.g., a stress in the substrate 101.

In some embodiments, a bottom cap (see, e.g., 113 in FIG. 1C) of the semiconductor device 100 is attached (e.g., glued) to a surface of a subject material to be measured. When the surface of the subject material is deformed due to, e.g., a force or a pressure applied, the semiconductor device 100 is also deformed, thus causing a stress (e.g., along direction 200 in FIG. 1A) in the substrate 101 of the semiconductor device 100, in some embodiments. The resistances of the resistors 130 (e.g., silicon piezoresistors) change in response to the stress of the substrate 101, which resistance change in turn causes a change in the output (e.g., a voltage between node 201 and node 203 in the Wheatstone bridge illustrated in FIG. 2) of the sensing bridge. Therefore, the output of the sensing bridge can be used to calculate the stress of the substrate 101, which may be equal to or proportional to a stress of the subject material to be measured.

As illustrated in FIG. 1A, two of the resistors, e.g., resistors 103A and 103B, are perpendicular to a direction 200 of the stress in the substrate 101. In other words, the longitudinal axis of each of the resistors 103A/103B is perpendicular to the direction 200. Another two of the resistors, e.g., resistors 103C and 103D, are parallel to the direction 200. In other words, the longitudinal axis of each of the resistors 103C/103D is parallel to the direction 200. The direction 200 of the stress illustrated in FIG. 1A is merely an example, the direction of the stress may be in other directions, such as a direction perpendicular to the direction 200 illustrated in FIG. 1A.

FIG. 1A further illustrates the orientation of the coordinate system with respect to the crystallographic directions for the substrate 101, (e.g., a (100) silicon wafer), where the X-direction and the Y-direction are along the crystallographic axes [110] and [110], respectively. The X-direction and the Y-direction are rotated 45 degrees with respect to the main crystallographic axes [100] and [010] (see FIG. 1D), while the Z-direction is parallel to the main crystallographic direction [001]). In FIG. 1A, the direction 200 is therefore rotated by 45 degrees with respect to the crystallographic axes [100] and [010]. Accordingly, the longitudinal axes of the four resistors 103A/103B/103C/103D of the semiconductor strain gauge 130 are rotated by 45 degrees with respect to the crystallographic axes [100] or [010]. In other words, the longitudinal axis of each of the four resistors 103 forms an angle of 45 degrees with the crystallographic axes [100] and [010], which advantageously maximizes the sensitivity of the resistors 103 (e.g., silicon piezoresistors) to the stress of the substrate 101.

In some embodiments, by rotating two of the resistors (e.g., 103A/103B) 90 degrees with respect to the other two resistors (e.g., 103C/103D), the resistors 103A/103B and the resistors 103C/103D have opposite signs of correlation with stress. In particular, two of the resistors (e.g., 103C/103D) may have a positive correlation with the stress to be measured. In other words, the resistances of two of the resistors (e.g., 103C/103D) increase with increased stress level e.g., along the direction 200, and decrease with decreased stress level along the direction 200. In contrast, the other two resistors (e.g., 103A/103B) may have a negative correlation with the stress to be measured. In other words, the resistances of the other two resistors (e.g., 103A/103B) decrease with increased stress level e.g., along the direction 200, and increase with decreased stress level along the direction 200. In some embodiments, the resistors 103A/103B are used as resistors R1/R3 in the Wheatstone bridge of FIG. 2, and the resistors 103C/103D are used as resistors R2/R4 in the Wheatstone bridge of FIG. 2. Due to the opposite signs of correlation, the sensitivity of the sensing bridge (e.g., a Wheatstone bridge) is increased compared with embodiments where all four resistors in the sensing bridge have a same sign of correlation with stress.

In some embodiments, the resistors 103A/103B/103C/103D are polycrystalline piezoresistors. In other embodiments, the resistors 103A/103B/103C/103D are monocrystalline piezoresistors. In yet another embodiment, two of the resistors 103A/103B/103C/103D are polycrystalline piezoresistors, and the other two of the resistors 103A/103B/103C/103D are monocrystalline piezoresistors. The piezoresistors may be formed by depositing a piezoresistive material over the substrate 101. The orientation of the resistors 103 in FIG. 1A is merely an example and not limiting, the resistors 103 may be oriented in other directions. For example, all of the resistors 103A/103B/103C/103D may be oriented in a same direction (e.g., parallel to each other), which may be appropriate when the stress of the substrate is not homogeneous (e.g., different at different locations).

In the example of FIG. 1A, the strain gauge includes piezoresistors connected in a Wheatstone bridge configuration. In other embodiments, the strain gauge 130 includes a capacitive element (e.g., a capacitor) instead of piezoresistors connected in a Wheatstone bridge configuration. A capacitance of the capacitive element may be proportional to the stress in the substrate, and may be configured to change in response to a change in the stress in the substrate. For example, the capacitive element may have two armatures forming two comb fingers. In yet other embodiments, the strain gauge 130 comprises a piezoelectric material, in which case the strain gauge senses the stress using, e.g., a single piezoelectric material, instead of the Wheatstone bridge having four piezoresistors. The strain gauge 130 therefore measures a voltage from the piezoelectric material caused by the stress. The strain gauge 130 with the piezoelectric material may be well suited for a dynamic system.

Still referring to FIG. 1A, the temperature sensor 107 is suspended from the substrate 101 by the silicon spring 105, which has a width W (see label W in FIG. 1C) between, e.g., about 20 μm and about 100 μm, although other dimensions are also possible. A thickness of the silicon spring 105, measured along a direction perpendicular to an upper surface 101U (see label in FIG. 1C) of the substrate 101, may be between about 100 μm and about 200 μm. The thickness of the silicon spring 105 is equal to a thickness $T_1$ (see label in FIG. 1C) of the temperature sensor 107, in an embodiment. The silicon spring 105 is a flexible structure made of an elastic semiconductor material, such as silicon, silicon germanium, silicon carbide, or other suitable material. In some embodiments, the silicon spring 105 comprises a same material as the substrate 101. One skilled in the art will appreciate that the material of the silicon spring 105 is not limited to silicon, and instead, may comprise any suitable elastic material.

Since the temperature sensor 107 is suspended by the silicon spring 105 and is not in physical contact with the substrate 101, the silicon spring 105 mechanically decouples the temperature sensor 107 from the substrate 101, such that the stress in the substrate 101 is decoupled from (e.g., does not affect) the temperature sensor 107. In the illustrated embodiment, electrically conductive features, such as conductive lines, are formed in the silicon springs 105 to electrically couple the temperature sensor 107 with other circuits and/or conductive features on the substrate 101, such as the conductive pads 119, or a digital logic (see, e.g., 140 in FIG. 3) integrated on the substrate 101. In addition, the silicon spring 105 thermally couples the temperature sensor 107 with the substrate 101, in the illustrated embodiment.

Although the silicon spring 105 is illustrated in FIG. 1A as having an L-shape, other suitable shapes, such as a straight line shape, may also be used. In addition, more than one silicon springs (e.g., two, four) may be used to suspend the temperature sensor 107. For example, two silicon springs may be formed that are attached to opposing sides (e.g., sidewalls) of the temperature sensor 107 to suspend the temperature sensor 107 from the substrate 101.

Figure 1C:
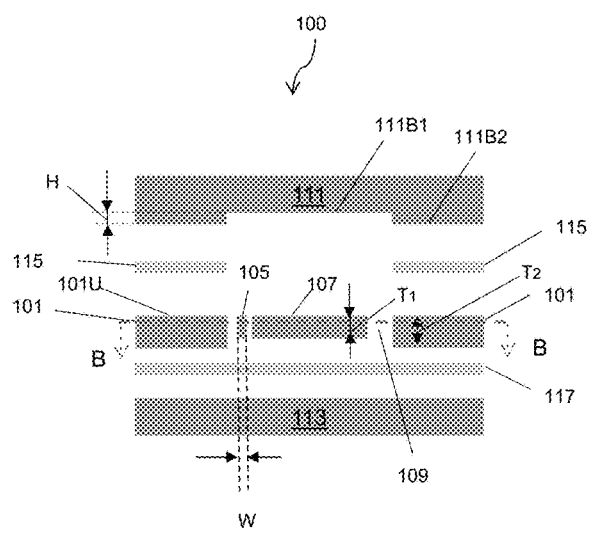
FIG. 1C illustrates a cross-sectional view of the semiconductor device of FIG. 1A, in some embodiments.
Figure 1B:
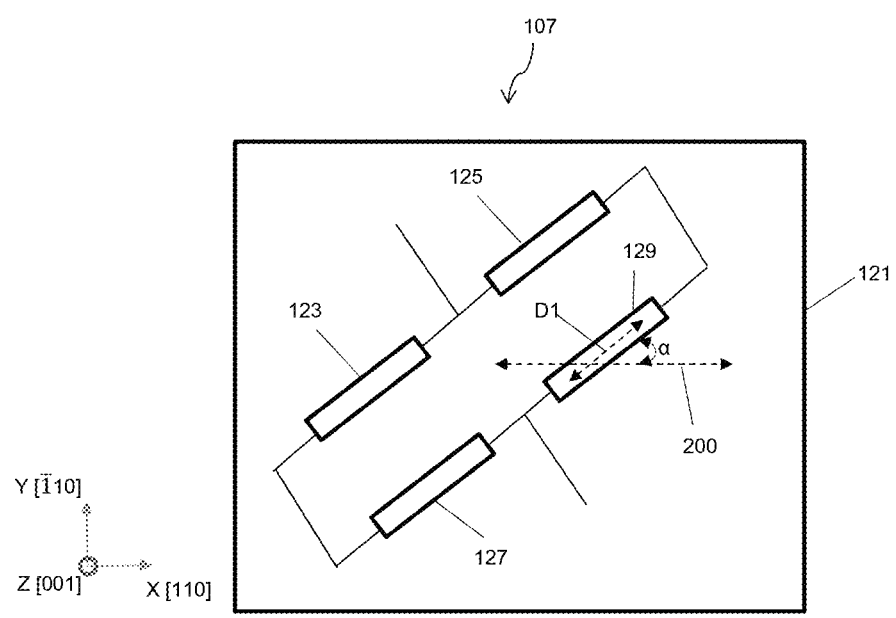
FIG. 1B illustrates a portion of a temperature sensor of the semiconductor device of FIG. 1A, in some embodiments.

FIG. 1B illustrates a portion of the temperature sensor 107. For reference, the coordinate system (e.g., X-direction, Y-direction and Z-direction) shown in FIG. 1A is also plotted in FIG. 1B. Not all of the components of the temperature sensor 107 are illustrated in FIG. 1B. As illustrated in FIG. 1B, the temperature sensor 107 comprises a thermal bridge having four resistors 123, 125, 127 and 129. In some embodiments, the resistors 123, 125, 127 and 129 are piezoresistors, such as monocrystalline resistors or polycrystalline resistors, formed in and/or on a substrate 121 of the temperature sensor 107. The substrate 121 may be a same or similar as the substrate 101, details are thus not repeated. In some embodiments, patterns, devices, and/or circuits corresponding to the silicon spring 105 and the temperature sensor 107 are formed in/on the substrate 101 along with the semiconductor strain gauge 130 first, then portions of the substrate 101 are removed, e.g., using appropriate etching method(s), to form the silicon spring 105 and to separate the temperature sensor 107 from the remaining portions of the substrate 101.

In some embodiments, the orientation of the crystallographic planes of the silicon substrate 101 and the orientation of the piezoresistors 103 are chosen in such a way to maximize the output of the piezoresistors 103 due to the mechanical stress. In some embodiments, the orientation of the crystallographic planes of the silicon substrate 101 and the orientation of the thermal piezoresistors (e.g., 123, 125, 127, 129) are chosen in such a way to minimize the effect of stress on the thermal bridge.

The resistors 123, 125, 127 and 129 are electrically connected in a Wheatstone bridge configuration (see, e.g., FIG. 2) to form a thermal bridge for temperature measurement. In the illustrated example, all four resistors in the thermal bridge are oriented at 45 degrees with respect to the direction 200 (see also FIG. 1A) of the stress in the substrate 101. In other words, a longitudinal axis of each of the resistors 123, 125, 127 and 129 forms an angle α with the direction 200, which angle α is 45 degrees. Recall that in FIG. 1A, the direction 200 forms an angle of 45 degree with the crystallographic axes [100] and [010]. Therefore, the longitudinal axis of each of the resistors 123, 125, 127 and 129 is aligned (e.g., parallel) with crystallographic axes [100] or [010], which advantageously minimizes the effect of stress on the thermal bridge.

In some embodiments, two resistors in the thermal bridge, e.g., 123 and 129, have a positive correlation with the temperature, and the other two resistors, e.g., 125 and 127, have a negative correlation with the temperature. In some embodiments, a particular type of dopant (e.g., N-type dopant, or P-type dopant) may be used in the manufacturing process of the semiconductor resistors 123/125/127/129 to achieve a designed correlation (e.g., positive correlation, or negative correlation) with the temperature. Therefore, two of the resistors (e.g., 123/129) in the thermal bridge may be doped with a first type of dopant (e.g., N-type), while the other two resistors (e.g., 125/127) may be doped with a second type of dopant (e.g., P-type) different from the first type of dopant. In some embodiment, a first type of resistors (e.g., N-type resistors, or P-type resistors) is formed by ion implantation and/or by diffusion while a second type of resistors (e.g., P-type resistors, or N-type resistors) is formed by Chemical Vapor Deposition (CVD). Therefore, the first type of resistors may be monocrystalline, while the second type of resistors may be polycrystalline. In other words, two of the resistors (e.g., 123 and 129) in the thermal bridge may be P-type monocrystalline semiconductor resistors, while two other resistors (e.g., 125 and 127) in the thermal bridge may be N-type polycrystalline semiconductor resistors. By using resistors having opposite signs of correlation (e.g., positive correlation and negative correlation) with temperature, sensitivity of the thermal bridge (e.g., a Wheatstone bridge) is advantageously increased.

FIG. 1D is a polar plot illustrating the piezoresistivity coefficients of a P-type monocrystalline resistor (e.g., a P-type monocrystalline silicon piezoresistor) formed in the substrate 101, which is a (100) silicon wafer in the illustrated example. In particular, curves 151 and 153 illustrate the piezoresistivity coefficients of the semiconductor resistor with respect to the stress of the substrate along the longitudinal direction and the transversal direction, respectively. Note that FIG. 1D is only plotted for angles between 0 and 180 degrees. The curves 153 are plotted in the lower half of the plot to indicate negative values. For reference, the coordinate system (e.g., X-direction, Y-direction and Z-direction) shown in FIG. 1A is also plotted in FIG. 1D. In the example of FIG. 1D, maximum piezoresistivity coefficients are achieved along the X-direction, Y-direction, and the opposite directions of the X-direction and the Y-direction. Therefore, to minimize the effect of the stress on the resistors in the thermal bridge, the direction of the resistors in the thermal bridge may be formed along the $D_1$ direction illustrated in FIG. 1D, which D1 direction is rotated by 45 degrees from the X-direction. Note that FIG. 1D is merely an example, the polar plot of the piezoresistivity coefficients of other types (e.g., P-type, N-type) of semiconductor resistors in other substrate with different crystallographic planes are different from what is illustrated in FIG. 1D, and therefore, the orientation of the resistors in the thermal bridge should be chosen accordingly to minimize the effect of the stress on the resistors in the thermal bridge, which orientation may be along any suitable direction.

Referring back to FIG. 1B, two of the resistors (e.g., 123, 129) in the thermal bridge are P-type monocrystalline silicon piezoresistors, and the other two resistors (e.g., 125, 127) in the thermal bridge are N-type polycrystalline silicon piezoresistors. In the illustrated embodiment, the P-type monocrystalline silicon piezoresistors resistors (e.g., 123, 129) are oriented in a pre-determined direction (e.g., along direction D1) to minimize the effect of stress on them. Although the orientation of a polycrystalline silicon piezoresistor does not affect the piezoresistivity coefficient of the polycrystalline silicon piezoresistor, to simplify the design of the thermal bridge 107, the orientation of the N-type polycrystalline silicon piezoresistors (e.g., 125, 127) are chosen to be the same as (e.g., parallel to) the orientation of the P-type monocrystalline silicon piezoresistors resistors (e.g., 123, 129). The substrate 121 may be doped (e.g., by an N-type dopant) to further simplify the usage of P-type monocrystalline piezoresistors.

Note that FIG. 1B is merely an example, the orientation of each of the resistors in the thermal bridge 107 may be along any suitable direction, depending on factors such as the type (e.g., N-type, or P-type) of the resistor, whether the resistor is a polycrystalline resistor or a monocrystalline resistor, and the substrate doping type (e.g., P-type, or N-type). For example, in another embodiment, two of the resistors (e.g., 123, 129) in the thermal bridge are N-type monocrystalline silicon piezoresistors, and the other two resistors (e.g., 125, 127) in the thermal bridge are P-type monocrystalline silicon piezoresistors. The N-type monocrystalline silicon piezoresistors (e.g., 123, 129) are oriented in a first direction to minimize the effect of stress, and the P-type monocrystalline silicon piezoresistors (e.g., 125, 127) are oriented in a second direction different from (e.g., intersecting) the first direction to minimize the effect of stress. The angle between the first direction and the second direction can be any angle (e.g., not limited to 45 degrees or multiples of 45 degrees), depending on the polar plots of the piezoresistivity coefficients of the N-type monocrystalline silicon resistors and the P-type monocrystalline silicon resistors.

FIG. 1C illustrates the exploded cross-sectional view of the semiconductor device 100 of FIG. 1A along cross-section A-A, and FIG. 1A shows the plan view of the semiconductor device 100 along cross-section B-B in FIG. 1C. As illustrated in FIG. 1C, the temperature sensor 107 is formed in the opening 109, and is suspended by the silicon spring 105. A thickness $T_1$ of the temperature sensor 107 is smaller than a thickness $T_2$ of the substrate 101, where T2 may be, e.g., between about 300 μm and about 400 μm. This allows the temperature sensor 107 to be suspended in the opening 109 without touching surrounding structures, e.g., a bonding material 117 under the temperature sensor 107. The bonding material 117, which may be a glass bonding material, bonds the lower surface of the substrate 101 to a bottom cap 113. The bottom cap 113 may be formed of an elastic material such as silicon, silicon-carbide, glass, ceramic, a metal (such as steel), or other elastic material. The bottom cap 113 may then be attached (e.g., glued, or soldered using, e.g., a Tin-silver-copper (SnAgCu) alloy, also known as SAC alloy) to the subject material to be measured. In some embodiments, in order to improve the linearity of the temperature sensor 107, elastic materials are used for components between the subject material and the temperature sensor 107, which components include, e.g., the bottom cap 113 and the bonding material 117.

Still referring to FIG. 1C, a bonding material 115, which may be a glass bonding material, bonds the upper surface of the substrate 101 to a top cap 11. The top cap may be formed of an elastic material same as or similar to the elastic material of the bottom cap 113, but may also be made of a non-elastic material such as rubber, epoxy resin, or silicone. The top cap 11 and the bottom cap 113 provide protection to the temperature sensor 107 and the semiconductor strain gauge 130. As illustrated in FIG. 1C, the top cap 111 has a recess in a middle portion directly over the temperature sensor 107. For example, a lower surface 111B1 of a center portion (e.g., a portion directly over the temperature sensor 107) of the top cap 111 extends further from the substrate 101 than a lower surface 111B2 of a peripheral portion of the top cap 111. An offset H between the lower surface 111B1 and the lower surface 111B2 may be in a range between about 50 μm and about 250 μm, although other dimensions are also possible. In the discussion herein, the semiconductor device 100 may also be referred to as a stress sensor, a stress sensor with an integrated temperature sensor, or a stress sensor with temperature compensation.

Since the semiconductor strain gauge 130 and the temperature sensor 107 are both integrated on a same semiconductor die, the stress sensor (e.g., semiconductor devices 100) has a much smaller form factor than form factors of designs where strain gauge and temperature sensor are formed on separate dies. As will be discussed hereinafter with reference to FIG. 7, the smaller form factor allows more flexible placement of the stress sensor on a membrane to which the stress sensor is attached. The flexible placement of the stress sensor allows the stress sensor to be placed at optimum or near-optimum locations of the membrane for increased sensitivity. As another advantage, the small form factor of the present disclosure allows more than one stress sensors to be placed on a small subject to be measured when space is limited. The additional sensors may be used to provide redundancy to protect against device failure, which redundancy may be important for mission critical applications such as automobile safety, or medical applications.

Variations to the illustrated embodiments are possible and are fully intended to be included within the scope of the present disclosure. For example, in FIG. 1C, an upper surface of the temperature sensor 107 is level with the upper surface 101U of the substrate 101. This is merely an example and not intended to be limiting. In other embodiments, the upper surface of the temperature sensor 107 is lower (e.g., closer to the glass bonding material 117) than the upper surface 101U of the substrate 101. In other words, the upper surface and the lower surface of the temperature sensor 107 may both be disposed between the upper surface 101U of the substrate 101 and the lower surface of the substrate 101 opposing 101U, which is made possible by $T_1$ being smaller than $T_2$. As another example, the top cap 111, the bottom cap 113, or both the top cap 111 and bottom cap 113 may be omitted. For instance, the lower surface of the substrate 101 may be bonded by the bonding material 117 to the subject material directly.

Figure 2:
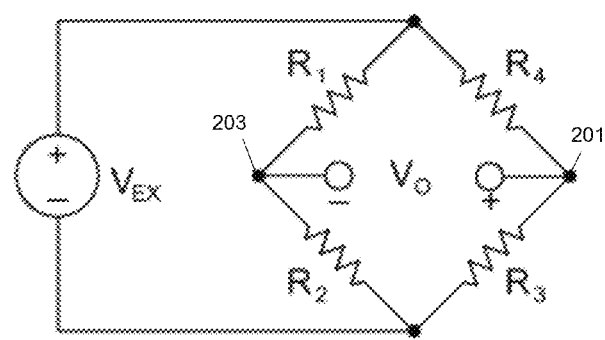
FIG. 2 illustrates a Wheatstone bride, in some embodiments.

FIG. 2 illustrates a circuit diagram for a Wheatstone bridge. Note that as a circuit diagram, FIG. 2 illustrates the electrical connections between electrical components (e.g., resistors $R_1$, $R_2$, $R_3$ and $R_4$), but not the physical locations and/or physical orientations of the electrical components on the substrate 101. Wheatstone bridge may be used in circuit design for various measurement applications due to its high accuracy and high sensitivity. Depending on the characteristics of the value to be measured, the type of resistors in the Wheatstone bridge may be chosen to suit the specific sensing needs. For example, piezoresistors may be used for measuring stress.

Figure 3:
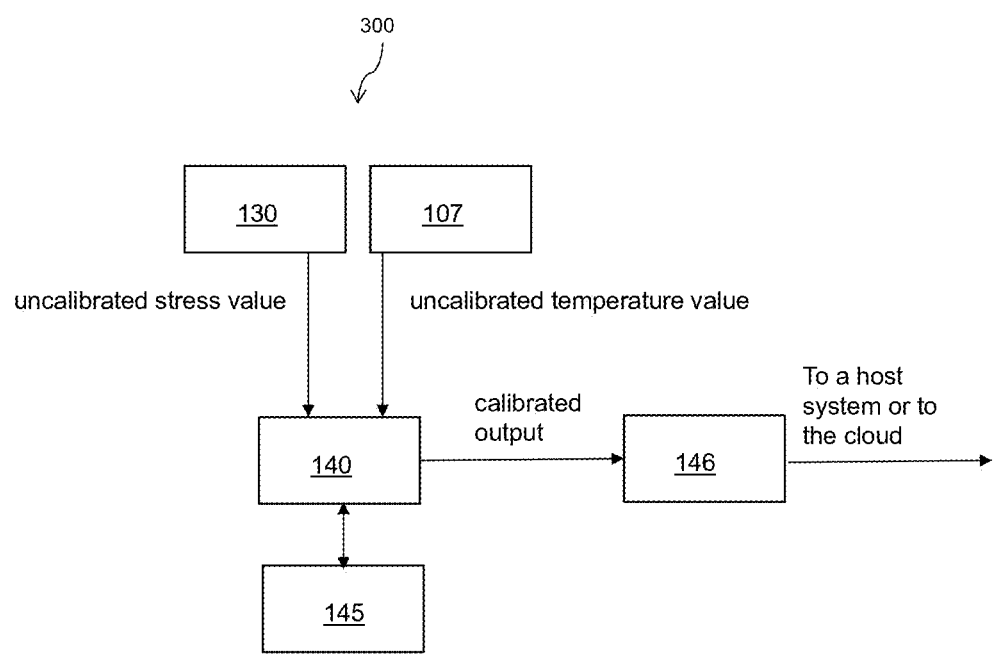
FIG. 3 illustrates a functional diagram of a stress sensing system, in some embodiments.

FIG. 3 illustrates a functional diagram of a stress sensing system 300 comprising the semiconductor strain gauge 130 and the temperature sensor 107 illustrated in FIGS. 1A-1C. In FIG. 3, the semiconductor strain gauge 130 and the temperature sensor 107 are electrically coupled to a digital logic 140, which digital logic 140 is further electrically coupled to a memory module 145 and a communication module 146. The digital logic 140 may comprise integrated circuits (e.g., analog-to-digital converters, micro-processing units, combinations thereof, or the like) formed in/on the substrate 101 that are designed to perform the calibration and/or the measurement functions of the stress sensing system 300, in some embodiments. The memory module 145 may comprise memory devices (e.g., static memory, dynamic memory, combinations thereof, or the like) that are used to store, e.g., calibration parameters of the semiconductor strain gauge 130 and calibration parameters of the temperature sensor 107. The memory module 145 may be formed in/on the substrate 101, in some embodiments. The communication module 146 may comprise wired or wireless communication devices (e.g., CAN, RS232, RS485, Ethernet, SPI, I2C, SENT, PSI5, Bluetooth, Bluetooth Low Energy, WiFi, ZigBee, 3G, NFC, RFID, combinations thereof, or the like) that are configured to transmit the calibrated output to a host system, or to transmit the calibrated output to the cloud for storage. The communication module 146 may also be configured to receive configuration data (e.g., from the host system) for the stress sensing system 300, such that the configuration data (e.g., calibration parameters or initialization data) may be stored locally in the memory module 145. The communication module 146 is formed in/on the substrate 101, in some embodiments.

Various ways of function partitioning and various level of integration for the stress sensing system 300 are possible, and are fully intended to be included within the scope of the present disclosure. In some embodiments, the semiconductor strain gauge 130, the temperature sensor 107, the digital logic 140, the memory module 145, and the communication module 146 are integrated in a same semiconductor die as an integrated semiconductor device. For example, all of the functional blocks shown in FIG. 3 may be integrated in the semiconductor device 100 illustrated in FIGS. 1A-1C. In other embodiments, the semiconductor strain gauge 130, the temperature sensor 107, the memory device 145, and the communication module 146 are integrated on a same semiconductor die, and the digital logic 140 may be formed on a separate die. In yet other embodiments, the semiconductor strain gauge 130 and the temperature sensor 107 are integrated on a same semiconductor die, and the digital logic 140, the memory module 145, and the communication module 146 are formed outside of the semiconductor die comprising 130 and 107.

Details of the calibration functions and the measurement functions for compensating the thermal drift of the semiconductor strain gauge 130 using the temperature sensor 170 are discussed herein. The calibration function and the measurement function of the temperature sensor 170 are discussed first, followed by the discussion of the calibration function and the measurement function of the semiconductor strain gauge 130.

Recall that the temperature sensor 107 is decoupled from the mechanical stress of the substrate 101. Therefore, the output of the temperature sensor 107 is independent of the stress of the substrate 101. Assuming a linear relation between the raw output (may also be referred to as the unprocessed output, or uncalibrated output) of the temperature sensor 107 and the value of the temperature to be measured, the calibration of the temperature sensor 107 may be performed by recording the uncalibrated output $T_{out\_T1}$ and $T_{out\_T2}$ from the temperature sensor 107 at two known temperature values $T_1$ and $T_2$, respectively, and calculating a temperature sensitivity $T_{sen}$ and a temperature offset $T_{off}$. In particular, the temperature sensitivity $T_{sen}$ and the temperature offset $T_{off}$ may be calculated using the following equations:

$$T_{sen} = \frac{T_{out\_T2} - T_{out\_T1}}{T_2 - T_1} \quad (1)$$

$$T_{off} = T_1 - \frac{T_{out\_T1}}{T_{sen}} \quad (2)$$

The unit of the temperature sensitivity $T_{sen}$ may be mV/V/° C., and the unit of the temperature offset $T_{off}$ may be ° C. Calibration of the temperature sensor 107 (and the semiconductor strain gauge 130) is normally performed at the final fabrication step of the semiconductor device 100. Once the temperature sensitivity $T_{sen}$ and the temperature offset $T_{off}$ (also referred to as the calibration parameters of the temperature sensor) are obtained by the calibration process, they are stored, e.g., in the memory module 145 of FIG. 3, and used in normal operation mode to convert uncalibrated output of the temperature sensor 107 into calibrated output.

Normal operation mode (e.g., for measuring the temperature and the stress) of the temperature sensor 107 is now described. Denote the uncalibrated output from the temperature sensor 107 as $T_{out}$, then a calibrated temperature output $T_{calibrated}$ may be calculated, e.g., by the digital logic 140 of FIG. 3, using the following equation:

$$T_{calibrated} = \frac{T_{out}}{T_{sen}} + T_{off} \quad (3)$$

Therefore, equation (3) converts the uncalibrated output $T_{out}$ from the temperature sensor 107 into the calibrated output $T_{calibrated}$, which gives an estimate of the temperature value to be measured.

Calibration of the semiconductor strain gauge 130 is similar but more complicated, because both the temperature and the stress affect the output of the semiconductor strain gauge 130. In some embodiments, calibration of the semiconductor strain gauge 130 comprises recording output of the semiconductor strain gauge 130 under four different calibration conditions, which calibration conditions are the combination between two different known temperature conditions (e.g., temperature values $T_1$ and $T_2$) and two different known stress conditions (e.g., stress values $P_1$ and $P_2$).

Denote the raw output (may also be referred to as the unprocessed output, or uncalibrated output) of the semiconductor strain gauge 130 at temperature $T_1$ and under stress level P1 as $P_{out\_T1\_P1}$, the raw output at temperature $T_1$ and under stress level $P_2$ as $P_{out\_T1\_P2}$, the raw output at temperature $T_2$ and under stress level $P_1$ as $P_{out\_T2\_P1}$, and the raw output at temperature $T_2$ and under stress level $P_2$ as $P_{out\_T2\_P2}$. The calibration process of the semiconductor strain gauge 130 computes a pressure sensitivity $P_{sen\_T1}$ and a pressure offset $P_{off\_T1}$ at temperature $T_1$ using the following equations:

$$P_{sen\_T1} = \frac{P_{out\_T1\_P2} - P_{out\_T1\_P1}}{P_2 - P_1} \quad (4)$$

$$P_{off\_T1} = P_1 - \frac{P_{out\_T1\_P1}}{P_{sen\_T1}} \quad (5)$$

In addition, the calibration process of the semiconductor strain gauge 130 computes a pressure sensitivity value $P_{sen\_T2}$ and a pressure offset $P_{off\_T2}$ at temperature $T_2$ using the following equations:

$$P_{sen\_T2} = \frac{P_{out\_T2\_P2} - P_{out\_T2\_P1}}{P_2 - P_1} \quad (6)$$

$$P_{off\_T2} = P_1 - \frac{P_{out\_T2\_P1}}{P_{sen\_T2}} \quad (7)$$

Once the pressure sensitivity values (e.g., $P_{sen\_T1}$, $P_{sen\_T2}$) and the pressure offsets (e.g., $P_{off\_T1}$, $P_{off\_T2}$) are obtained, the calibration process computes a pressure sensitivity drifting rate $P_{sen\_drift}$ and a pressure offset drifting rate $P_{off\_drift}$ using the following equations:

$$P_{sen\_drift} = \frac{P_{sen\_T2} - P_{sen\_T1}}{T_2 - T_1} \quad (8)$$

$$P_{off\_drift} = \frac{P_{off\_T2} - P_{off\_T1}}{T_2 - T_1} \quad (9)$$

The unit of the pressure sensitivity (e.g., $P_{sen\_T1}$, $P_{sen\_T2}$) may be mV/V/bar, the unit of the pressure offset (e.g., $P_{off\_T1}$, $P_{off\_T2}$) may be bar, the unit of the pressure sensitivity drifting rate may be mV/V/bar/° C., and the unit of the pressure offset drifting rate may be bar/° C. Once the calibration process is done (e.g., at the end of the semiconductor fabrication process), the calculated calibration parameters, such as $P_{sen\_drift}$, $P_{off\_drift}$, $P_{sen\_T1}$ and $P_{off\_T1}$, are stored in, e.g., the memory module 145 of FIG. 3 for later use in the normal operation mode of the semiconductor strain gauge 130, which is described blow. The known temperature values $T_1$ and $T_2$ may also be stored in the memory module 145.

During normal operation mode of the semiconductor strain gauge 130, the digital logic 140 of FIG. 3 performs the following operations to compute a temperature-compensated value for the stress. Specifically, denote the raw output from the temperature sensor 107 as $T_{out}$ and the raw output from the semiconductor stain gauge 130 as $P_{out}$, the digital logic 140 first converts the raw temperature output $T_{out}$ into the calibrated temperature $T_{calibrated}$ using equation (3) above. Next, using the calibration parameters, a linear interpolation is performed by the digital logic 140 to compute a pressure sensitivity $P_{sen}$ and a pressure offset $P_{off}$ at the calibrated temperature $T_{calibrated}$ using the following equations:

$$P_{sen} = P_{sen\_drift} * (T_{calibrated} - T_1) + P_{sen\_T1} \quad (10)$$

$$P_{off} = P_{off\_drift} * (T_{calibrated} - T_1) + P_{off\_T1} \quad (1)$$

Next, the calibrated stress value (e.g., temperature compensated stress value) $P_{calibrated}$ is calculated using the following equation:

$$P_{calibrated} = \frac{P_{out}}{P_{sen}} + P_{off} \quad (12)$$

Equations (1)-(12) above are merely an example of the various algorithms that may be used to estimate the temperature value and/or the stress value. Other equations and/or other algorithms are possible and are fully intended to be included within the scope of the present disclosure. For example, in equation (2), the temperature offset $T_{off}$ may be calculated using the calibration data taken at temperature $T_2$ instead of temperature $T_1$. As another example, the linear interpolation performed in equations (10) and (11) may use $P_{sen\_T2}$ and $P_{off\_T2}$ as the reference point of the interpolation instead of $P_{sen\_T1}$ and $P_{off\_T1}$.

The equations described above are linear interpolations using only two temperature or pressure points. In order to increase accuracy, since there may be second order non-linear effects in sensor devices, it is possible to use non-linear characterizations (e.g. quadratic or cubic interpolations) for the interpolations. In addition, it is possible to divide the operating ranges (e.g., the temperature range, or the pressure range) into two or more segments, and compute a set of calibration parameters for each segment.

As another example, the calibration procedure may be performed after the sensor 100 is attached to (e.g., soldered on) a substrate whose stress is to be measured. In this case the variable to be measured (e.g., pressure) in the equations above may be substituted by force (e.g. with a unit of newton (N)) or torque (e.g. with a unit of newton meter (Nm)).

Figure 4A:
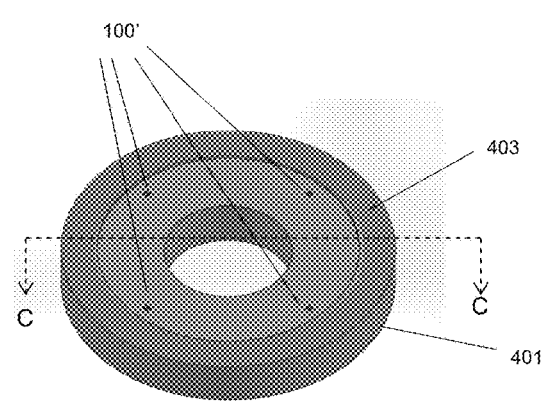
FIG. 4A illustrates an embodiment configuration for measurement of a force applied to an object using one or more stress sensors.
Figure 4B:
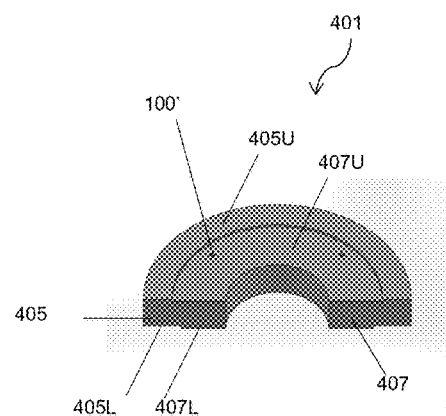
FIG. 4B illustrates a cross-section of the object of FIG. 4A.

FIG. 4A illustrates an embodiment configuration for measuring a force applied to an object. As illustrated in FIG. 4A, a force is applied to a ring-shaped area 403 of a washer-shaped object 401. FIG. 4B illustrates the cross-section of the washer-shaped object 401 along line C-C in FIG. 4A. As shown in FIG. 4B, the washer-shaped object 401 has an outer ring-shaped portion 405 and an inner ring-shaped portion 407. There is a vertical offset between the outer ring-shaped portion 405 and the inner ring-shaped portion 407, such that the upper surface 405U and the lower surface 405L of the outer ring-shaped portion 405 are higher than the upper surface 407U and the lower surface 407L of the inner ring-shaped portion 407, respectively. In the example of FIGS. 4A and 4B, a clamping device (not shown) clamps to the upper surface 405U and the lower surface 407L to apply the force. Therefore, the ring-shaped area 403 in FIG. 4A corresponds to the upper surface 405U of the outer ring-shaped portion 405. In addition, force is applied to the lower surface 407L of the inner ring-shaped portion 407. The washer-shaped object 401 is a metal object (e.g., an object made of steel), in the illustrated example.

In FIG. 4A, four semiconductor sensors 100', which may be the same as the semiconductor device 100 illustrated in FIG. 1A, are used to measure the force applied to the object 401. In some embodiments, each of the semiconductor sensors 100' comprises a semiconductor strain gauge and a temperature sensor to provide a temperature compensated estimate of the force applied to the object 401, which temperature compensated estimate is substantially free of thermal-drift. By using three semiconductor sensors 100', three-dimensional sensing may be achieved, e.g., for a non-homogeneously applied force. A fourth semiconductor sensor 100' provides redundancy in case of device failure, which redundancy may be important for mission critical applications such as automobile safety and medical applications. In embodiments where three-dimensional sensing is not needed, two semiconductor sensors 100' may be used—one for measurement and one to provide redundancy. In some embodiments, only one semiconductor sensor 100' is used, e.g., for low-cost applications. In embodiments where the object 401 is highly conductive of heat (e.g., a steel object) and has a substantially uniform temperature distribution throughout, one (or two to provide redundancy) of the semiconductor sensors 100' may include a temperature sensor and a semiconductor strain gauge, and the remaining semiconductor sensors 100' may only has a semiconductor strain gauge (e.g., without a temperature sensor integrated), because the measured temperature value from the temperature sensor can be shared by all the sensors. This allows for a low cost solution for three-dimensional sensing.

FIGS. 5A and 5B illustrate the cross-sectional view and the top view of a system for measuring a pressure (e.g., fluid pressure), in some embodiments. In FIG. 5A, two semiconductor devices 100 of FIG. 1A are attached (e.g., glued) to an upper surface of a membrane 501 (e.g., a metal membrane). The membrane 501 is attached to a frame 503, which may form an enclosure around a space 505. In the illustrated example, a high-pressure fluid fills the space 505 and is disposed on a lower side (e.g., under the lower surface of the membrane 501) of the membrane 501. The upper side membrane 501 may be exposed to, e.g., ambient air. A first one of the semiconductor devices 100 may be used for measuring the pressure of the fluid while a second one of the semiconductor devices 100 may be used to provide redundancy.

Figure 5C:
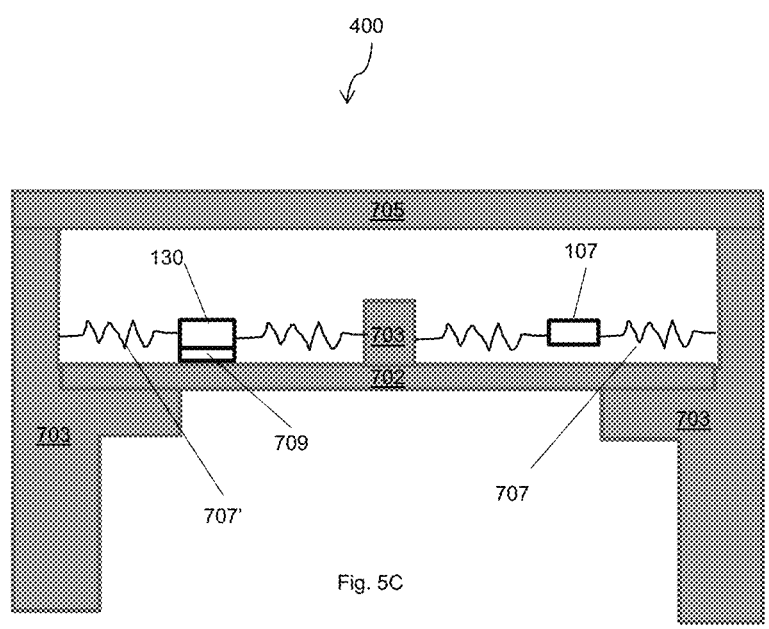
FIG. 5C illustrates a cross-sectional view of a device for measuring stress, in some embodiments.

FIG. 5C illustrates the cross-sectional view of an embodiment device 400 for measuring stress. In FIG. 5C, a membrane 702 (e.g., a metal membrane, a silicon membrane, a silicon carbide membrane, or a ceramic membrane) is attached to a frame 703. The frame 703 comprise a suitable material that provides structural support, such as a metal (e.g., steel), or a semiconductor material (e.g., silicon, silicon-carbide, germanium, the like, or combinations thereof), in some embodiments. A temperature sensor 107, such as the temperature sensor 107 illustrated in FIG. 1A, is attached to the frame 703 by springs 707, which springs 707 may be the same or similar to the silicon spring 105 in FIG. 1A, in some embodiments. Besides semiconductor materials, the springs 707 may comprise other suitable materials, such as steel, copper, tungsten, or the like. The temperature sensor 107 is decoupled from the stress in, e.g., the frame 703 and/or the membrane 702, and therefore, the measured temperature value is not affected by the mechanical stress. A semiconductor strain gauge 130, such as the semiconductor strain gauge 130 illustrated in FIG. 1A, is attached to the membrane 702 by an adhesive layer 709 (e.g., glass bonding). Optionally, the semiconductor strain gauge 130 is attached to the frame 703 by springs 707', which may be the same or similar to the springs 707. The device 400 may further include a cover 705 attached to the frame 703 for protection of the semiconductor strain gauge 130 and the temperature sensor 107, which cover 705 may comprise a same material as the frame 703. During measurements, the lower surface of the membrane 702 may be in contact (e.g., direct contact, or indirect contact via a glue layer or a bonding layer such as glass) with a surface of a subject material (not shown) to be measured, or may be in contact directly with a fluid or a gas to be measured. Similar to the discussions above for the semiconductor device 100, the temperature sensor 107 provides an accurate measurement of the temperature that is independent of the mechanical stress, and the accurate measurement of the temperature is used to provide improved temperature compensation for removing thermal drift of the semiconductor strain gauge 130.

FIGS. 6A-6H illustrates cross-sectional views of a stress sensor 700 with integrated temperature sensor at various stages of fabrication, in accordance with an embodiment. The stress sensor 700 may be the same as or similar to the device 400 in FIG. 5C. Unless otherwise stated, the same reference numerals in FIGS. 6A-6H and FIG. 5C refer to the same or similar components, thus details may not be repeated.

Figure 6A:
FIGS. 6A-6H illustrates cross-sectional views of a stress sensor at various stages of fabrication, in an embodiment.
Figure 6B:
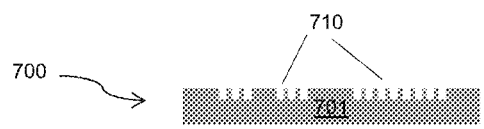
Figure 6C:
Figure 6D:

FIG. 6A illustrates the cross-sectional view of a substrate 701, which may comprise a semiconductor material such as silicon, silicon carbide, germanium, or the like. In some embodiments, the substrate 701 comprises a metal (e.g., steel), ceramic, or other suitable material. Next, in FIG. 6B, portions of the substrate 701 are removed, e.g., by an etching process, to form a plurality of recesses 710. Next, in FIG. 6C, an epitaxial material 713 is formed over the substrate 701. The epitaxial material 713 covers (e.g., seals) the recesses 710, as illustrated in FIG. 6C. Next, in FIG. 6D, a high temperature annealing using hydrogen is performed. In embodiments where the substrate 701 is a silicon substrate, the high temperature annealing may be performed at a temperature between about 900° C. and about 1200° C. The high temperature annealing causes portions of the substrate 701 between the recesses 710 to migrate towards the borders, and as a result, adjacent recesses 710 merge to form larger recesses 711. The high temperature annealing process is described in U.S. Pat. No. 7,811,848 B2, which is incorporated herein by reference.

Figure 6E:
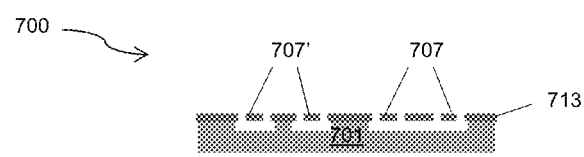
Figure 6F:
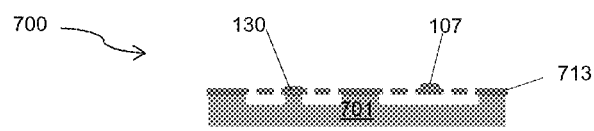

Referring next to FIG. 6E, the epitaxial material 713 is patterned, e.g., using photolithography and etching techniques. Portions of the patterned epitaxial material 713 form springs 707' and 707. Next, in FIG. 6F, semiconductor strain gauge 130 and temperature sensor 107 are formed in/on portions of the epitaxial material 713, e.g., between the springs 707' and between the springs 707 in FIG. 6E, respectively.

Figure 6G:
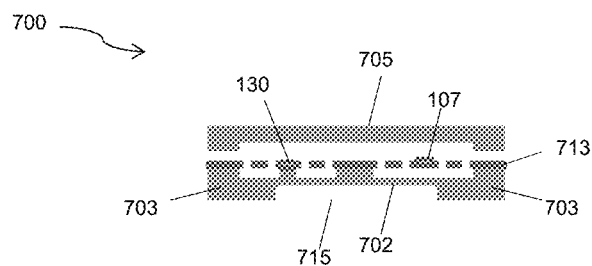

Next, in FIG. 6G, a recess 715 is formed in the lower surface of the substrate 701 by removing portions of the substrate 701 (e.g., using an etching process) disposed under the semiconductor strain gauge 130 and under the temperature sensor 107. A remaining portion of the substrate 701 over the recess 715 forms the membrane 702. Remaining portions of the substrate 701 surrounding the recess 715 (e.g., on the left side and right side of the recess 715 in FIG. 6G) form the frame 703. FIG. 6G further illustrates the cover 705, which may be formed by forming a recess in the lower surface of a layer comprising the material of the cover 705.

Figure 6H:
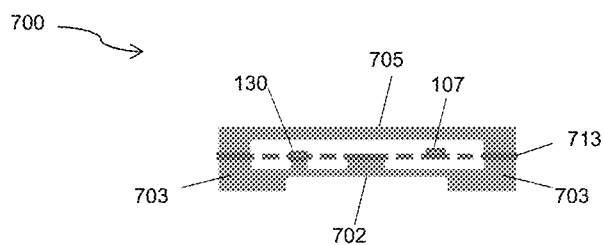

Next, in FIG. 6H, the cover 705 is attached (e.g., bonded) to the frame 703 to form the stress sensor 700. The stress sensor 700 may be used to measure pressure using the membrane 702, which may be in direct contact with a fluid whose pressure is to be measured.

Figure 6I:
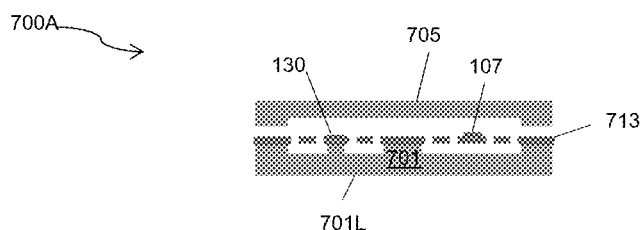
FIGS. 6I and 6J illustrate cross-sectional views of a stress sensor at various stages of fabrication, in an embodiment.
Figure 6J:
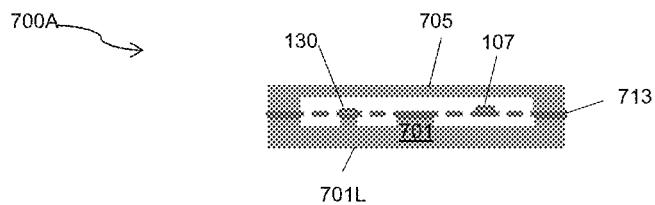

FIGS. 6I and 6J illustrates cross-sectional views of a stress sensor 700A, which is similar to the stress sensor 700 of FIG. 6H, but without the recess 715 (see FIG. 6G) in the lower surface of the substrate 701. The processing illustrates in FIG. 6 follows the processing steps illustrated in FIGS. 6A-6F. In FIG. 6I, the lower surface 701L of the substrate 701 is not etched, thus remains as a planar lower surface. The cover 705 may be formed similarly as the cover 705 in FIG. 6G. Next, in FIG. 6J, the cover 705 is attached (e.g., bonded) to the substrate 701 to form the stress sensor 700A. The planar lower surface 701L of the stress sensor 700A may be soldered to a substrate (not shown) to be measured, where the stress sensor 700A measures the stress of the substrate (not shown), which stress is induced by a pressure, a force, or a torque.

Figure 7:
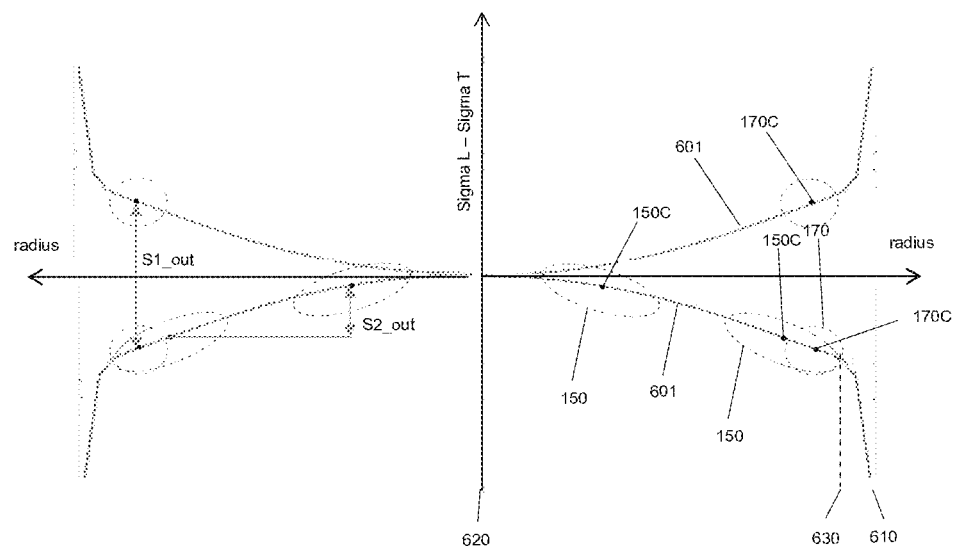
FIG. 7 illustrates the distribution of the stress combinations on a membrane, in some embodiments.

FIG. 7 shows the trend of Sigma L-Sigma T (where L stands for longitudinal direction, which is along the same direction of the resistor while T stands for transversal direction, which is perpendicular to the resistor) illustrating the distribution of the stress combinations on a membrane (e.g., 501 in FIG. 5B), in some embodiments. Since the resistivity variation of silicon piezoresistors is proportional to these stress combinations, the output of a Wheatstone bridge would also be proportional to Sigma L-Sigma T. In FIG. 7, the X-axis indicates the distance between a generic point of a membrane and a center (see, e.g., 501C of FIG. 5B) of the membrane along a specific axis up to the membrane edge (see, e.g., 501E of FIG. 5B). For example, the location 620 corresponds to the center of the membrane and the location 610 corresponds to the edge of the membrane. The Y-axis indicates the stress combinations (and therefore also the sensor output), with the absolute value of these combinations increasing non-linearly with the radius. The stress combination values at various locations on the membrane are shown by the curves 601. For example, in the embodiment semiconductor device 100, the resistors 103 are placed appropriately (e.g., two horizontally and two vertically) in order to maximize the sensor output. In particular, the sensor output will be proportional to the segment label S1_out in FIG. 7. FIG. 7 also illustrates the output (see the label S2_out in FIG. 7) of a reference stress sensor where all of the resistors are placed in the same direction.

As illustrated in FIG. 7, the stress combinations increase from the center of the membrane toward the edge of the membrane. In particular, in the center of the membrane, the two stress components are equal, thus resulting in Sigma L-Sigma T being zero. Between a locations 630 (which is close to the edge 610 of the membrane) and the location 610, the stress levels increase dramatically and may become unstable for measuring. Therefore, to achieve increased sensitivity, the location (e.g., the center of the stress sensor) of the stress sensor on the membrane may be chosen to be as close to the location 630 (where the stress level is large and easy to measure) as possible without crossing over to the right side of the location 630 (where the stress level may be unstable for measuring purpose) on the X-axis, in some embodiments.

The dashed circle 170 in FIG. 7 illustrates the position of an embodiment stress sensor 170 which may be the same as the semiconductor device 100 of FIG. 1A. If the resistors are placed two horizontally and two vertically, the output of the sensor in Wheatstone bridge configuration is proportional to the distance (on the Y axis) between the two points 170C. For comparison, two dashed ovals 150 are shown in FIG. 7 indicating the positions of the reference stress sensor that comprises two separate dies due to low level of integration. In the reference stress sensor, each of the two separate dies includes two piezoresistors to provide the four resistors used in the Wheatstone bridge. The size of each of the dies of the reference stress sensor is larger than the size of the semiconductor device 170, due to low level of integration.

As illustrated in FIG. 7, a center 170C of the embodiment stress sensor 170 is closer to the location 630 than a center 150C of the reference stress sensor, due to the smaller form factor of the embodiment stress sensor 170. This allows the embodiment stress sensor 170 to achieve better sensitivity than the reference stress sensor. In addition, the smaller form factor may allow a second embodiment stress sensor to be attached to the membrane to provide redundancy. In contrast, the large size of the reference stress sensor makes it impossible to place a second reference stress sensor on the membrane for redundancy.

Figure 8:
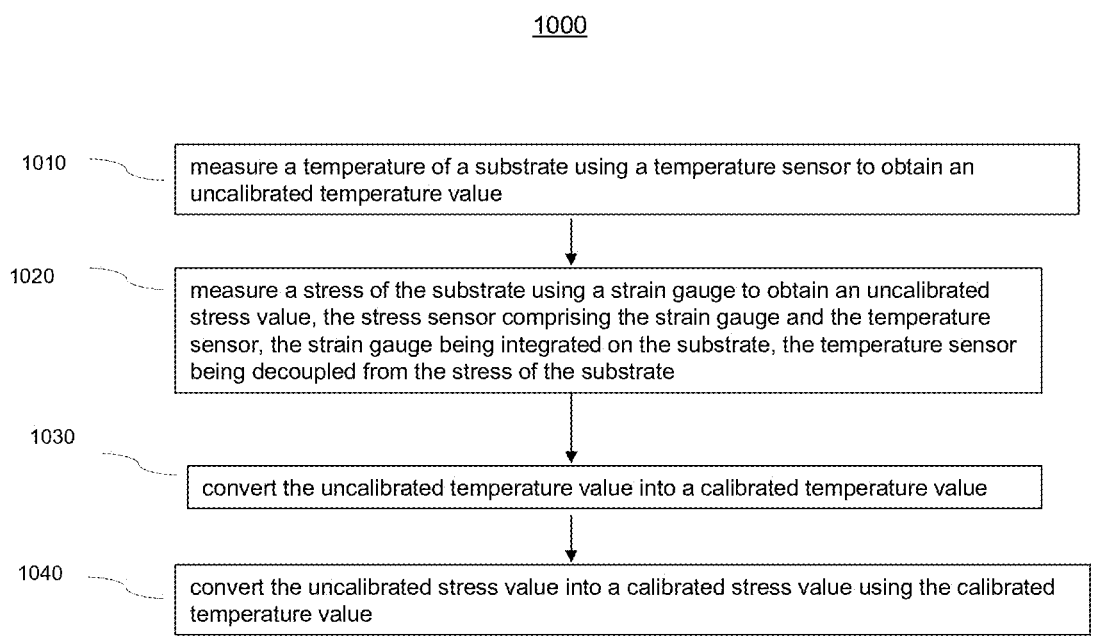
FIG. 8 illustrates a flow chart of a method for operating a stress sensor, in some embodiments.

FIG. 8 illustrates a flow chart of a method 1000 of operating a stress sensor, in some embodiments. It should be understood that the embodiment method shown in FIG. 8 is merely an example of many possible embodiment methods. One of ordinary skill in the art would recognize many variations, alternatives, and modifications. For example, various steps as illustrated in FIG. 8 may be added, removed, replaced, rearranged and repeated.

Referring to FIG. 8, at step 1010, a temperature of a substrate is measured using a temperature sensor to obtain an uncalibrated temperature value. At step 1020, a stress of the substrate is measured using a strain gauge to obtain an uncalibrated stress value, the stress sensor comprising the strain gauge and the temperature sensor, the strain gauge being integrated on the substrate, the temperature sensor being decoupled from the stress of the substrate. At step 1030, the uncalibrated temperature value is converted into a calibrated temperature value. At step 1040, the uncalibrated stress value is converted into a calibrated stress value using the calibrated temperature value.

Embodiments may achieve advantages. For example, due to the decoupling of the temperature sensor (e.g., 107) from the stress of the substrate, the measurement of the temperature sensor is not affected by the stress to be measured, which allows for accurate measurement of the temperature. The accurate measurement of the temperature in turns allows for better temperature compensation to remove the thermal drift from the output of the stress sensor. Due to high level of integration (e.g., the semiconductor strain gauge and the temperature sensor are integrated on a same die), smaller form factor is achieved, which allows for flexible placement of the stress sensor to achieve increased sensitivity. The small form factor also allows for multiple stress sensors to be placed on a subject to be measured to provide redundancy for mission critical applications.

Example embodiments of the present invention are summarized here. Other embodiments can also be understood from the entirety of the specification and the claims filed herein.

Example 1. In an embodiment, a semiconductor device includes a strain gauge on a substrate, the strain gauge configured to measure a stress of the substrate; and a temperature sensor disposed within the substrate, the temperature sensor being decoupled from the stress of the substrate.

Example 2. The semiconductor device of example 1, wherein the temperature sensor is attached to the substrate by a silicon spring.

Example 3. The semiconductor device of one of the preceding examples, where the substrate has an opening, and where the temperature sensor is in the opening and attached to the substrate by the silicon spring.

Example 4. The semiconductor device of example 3, where a thickness of the temperature sensor is smaller than a thickness of the substrate.

Example 5. The semiconductor device of example 3, where the silicon spring includes first conductive features that electrically couple the temperature sensor to second conductive features of the substrate.

Example 6. The semiconductor device of example 3, where the silicon spring thermally couples the temperature sensor to the substrate.

Example 7. The semiconductor device of example 1, where the strain gauge includes a sensing bridge, where the sensing bridge includes a first piezoresistor, a second piezoresistor, a third piezoresistor, and a fourth piezoresistor, where the first piezoresistor and the second piezoresistor have a positive correlation with the stress of the substrate, and wherein the third piezoresistor and the fourth piezoresistor have a negative correlation with the stress of the substrate.

Example 8. The semiconductor device of example 7, wherein the first piezoresistor and the second piezoresistor are parallel to a direction of the stress of the substrate, and the third piezoresistor and the fourth piezoresistor are perpendicular to the direction of the stress of the substrate.

Example 9. The semiconductor device of example 7, wherein the first piezoresistor, the second piezoresistor, the third piezoresistor, and the fourth piezoresistor are parallel to each other.

Example 10. The semiconductor device of example 7, where the first piezoresistor, the second piezoresistor, the third piezoresistor, and the fourth piezoresistor comprise four monocrystalline piezoresistors, four polycrystalline piezoresistors, or two monocrystalline piezoresistors and two polycrystalline piezoresistors.

Example 11. The semiconductor device of example 7, where the first piezoresistor, the second piezoresistor, the third piezoresistor, and the fourth piezoresistor comprise a piezoresistive material.

Example 12. The semiconductor device of example 1, wherein the strain gauge comprises a capacitive element, wherein a capacitance of the capacitive element is configured to change in response to a change in the stress of the substrate.

Example 13. The semiconductor device of example 1, wherein the strain gauge comprises a piezoelectric material.

Example 14. The semiconductor device of example 1, where the temperature sensor includes a thermal bridge, where the thermal bridge includes a first resistor, a second resistor, a third resistor, and a fourth resistor, and where the first resistor, the second resistor, the third resistor, the fourth resistor are electrically connected in a Wheatstone bridge configuration.

Example 15. The semiconductor device of example 14, where the first resistor, the second resistor, the third resistor, and the fourth resistor are orientated in a same direction Example 16. The semiconductor device of one of examples 14 and 15, where the first resistor and the second resistor have positive correlations with temperature, and the third resistor and the fourth resistor have negative correlations with temperature.

Example 17. The semiconductor device of example 15, where the first resistor and the second resistor are polycrystalline semiconductor resistors, and the third resistor and the fourth resistor are monocrystalline semiconductor resistors.

Example 18. The semiconductor device of example 1, where the strain gauge and the temperature sensor are integrated on a same semiconductor die.

Example 19. In an embodiment, a semiconductor device includes a frame having a semiconductor material, the frame surrounding a cavity in the frame; and a temperature sensor disposed in the cavity and being elastically attached to the frame by a spring having the semiconductor material.

Example 20. The semiconductor device of example 19, where the temperature sensor is physically separated from the frame.

Example 21. The semiconductor device of examples 19 or 20, where the temperature sensor includes a thermal bridge, and the thermal bridge includes a first resistor, a second resistor, a third resistor and a fourth resistor connected in a Wheatstone bridge configuration.

Example 22. The semiconductor device of example 21, where the first resistor, the second resistor, the third resistor, and the fourth resistor are parallel to each other.

Example 23. The semiconductor device of example 21, where a resistance of each of the first resistor and the second resistor has a positive correlation with temperature, and a resistance of each of the third resistor and the fourth resistor has a negative correlation with temperature Example 24. In an embodiment, a method of operating a stress sensor includes measuring a temperature of a substrate using a temperature sensor to obtain an uncalibrated temperature value; measuring a stress of the substrate using a strain gauge to obtain an uncalibrated stress value, the stress sensor including the strain gauge and the temperature sensor, the strain gauge being integrated on the substrate, the temperature sensor being decoupled from the stress of the substrate; converting the uncalibrated temperature value into a calibrated temperature value; and converting the uncalibrated stress value into a calibrated stress value using the calibrated temperature value.

Example 25. The method of example 24, further including, prior to measuring the temperature, calibrating the temperature sensor to obtain a temperature sensitivity and a temperature offset, where converting the uncalibrated temperature value is performed using the temperature sensitivity and the temperature offset.

Example 26. The method of example 24 or 25, further including, prior to measuring the stress, calibrating the strain gauge to obtain a plurality of calibration parameters, the plurality of calibration parameters includes a first pressure sensitivity at a first temperature; a first pressure offset at the first temperature; a second pressure sensitivity at a second temperature; and a second pressure offset at the second temperature, where converting the uncalibrated stress value is performed using the plurality of calibration parameters.

Example 27. The method of example 26, where calibrating the strain gauge comprises collecting output of the strain gauge under a plurality of calibration conditions, the plurality of calibration conditions includes a first pressure and the first temperature; a second pressure and the first temperature; the first pressure and the second temperature; and the second pressure and the second temperature.

Example 28. The method of example 26, where converting the uncalibrated stress value includes performing a linear interpolation using the plurality of calibration parameters and the calibrated temperature value to calculate a third pressure sensitivity and a third pressure offset; and calculating the calibrated stress value using the third pressure sensitivity and the third pressure offset.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of forming a semiconductor device, the method comprising:
    forming a strain gauge on a substrate, the strain gauge configured to measure a stress of the substrate; and
    forming a temperature sensor in an opening of the substrate, the temperature sensor being attached to the substrate by a spring.

2. The method of claim 1, wherein the spring decouples the temperature sensor from the stress of the substrate.

3. The method of claim 2, wherein the spring thermally couples the temperature sensor with the substrate.

4. The method of claim 2, wherein the spring is a silicon spring.

5. The method of claim 4, wherein the silicon spring comprises a first electrically conductive feature that electrically couples the temperature sensor to a second electrically conductive feature of the substrate.

6. The method of claim 1, wherein forming the strain gauge and forming the temperature sensor comprise:
    forming the strain gauge and the temperature sensor in a first portion and a second portion of the substrate, respectively; and
    after forming the strain gauge and the temperature sensor, patterning the substrate, wherein after the patterning, a third portion of the substrate around the second portion is removed to form the opening, a fourth portion of the substrate between the first portion and the second portion form the spring, and the second portion of the substrate comprising the temperature sensor is attached to the first portion of the substrate comprising the strain gauge by the spring.

7. The method of claim 1, wherein forming the strain gauge comprises forming a sensing bridge that includes a first piezoresistor, a second piezoresistor, a third piezoresistor, and a fourth piezoresistor, wherein the first piezoresistor and the second piezoresistor are formed to have a positive correlation with the stress of the substrate, and wherein the third piezoresistor and the fourth piezoresistor are formed to have a negative correlation with the stress of the substrate.

8. The method of claim 7, wherein a first longitudinal axis of the first piezoresistor and a second longitudinal axis of the second piezoresistor are formed to extend parallel to a direction of the stress of the substrate, and a third longitudinal axis of the third piezoresistor and a fourth longitudinal axis of the fourth piezoresistor are formed to extends perpendicular to the direction of the stress of the substrate.

9. The method of claim 7, wherein longitudinal axes of the first piezoresistor, the second piezoresistor, the third piezoresistor, and the fourth piezoresistor are formed to extend parallel to each other.

10. The method of claim 7, wherein the first piezoresistor, the second piezoresistor, the third piezoresistor, and the fourth piezoresistor are formed of a piezoresistive material.

11. The method of claim 7, wherein the first piezoresistor, the second piezoresistor, the third piezoresistor, and the fourth piezoresistor are formed as four monocrystalline piezoresistors, four polycrystalline piezoresistors, or two monocrystalline piezoresistors and two polycrystalline piezoresistors.

12. The method of claim 1, wherein forming the strain gauge comprises forming a capacitor, wherein a capacitance of the capacitor is configured to change in response to a change in the stress of the substrate.

13. A method of forming a semiconductor device, the method comprising:
    forming an opening in a substrate;
    forming a temperature sensor in the opening of the substrate; and
    forming a spring comprising a semiconductor material of the substrate, wherein the temperature sensor is attached to the substrate by the spring.

14. The method of claim 13, wherein the temperature sensor is suspended in the opening by the spring and is decoupled from a stress in the substrate.

15. The method of claim 13, wherein forming the temperature sensor comprises forming a thermal bridge that includes a first resistor, a second resistor, a third resistor, and a fourth resistor, and wherein the first resistor, the second resistor, the third resistor, the fourth resistor are electrically connected in a Wheatstone bridge configuration, wherein the first resistor and the second resistor are formed to have positive correlations with temperature, and the third resistor and the fourth resistor are formed to have negative correlations with temperature.

16. The method of claim 15, wherein longitudinal axes of the first resistor, the second resistor, the third resistor, and the fourth resistor are orientated in a same direction.

17. The method of claim 15, wherein the first resistor and the second resistor are formed as polycrystalline semiconductor resistors, and the third resistor and the fourth resistor are formed as monocrystalline semiconductor resistors.

18. A method of forming a semiconductor device, the method comprising:
   etching a substrate to form first recesses, second recesses, and third recesses that extend into the substrate from a first side of the substrate, wherein after the etching, a first portion of the substrate is disposed between the first recesses and the second recesses, and a second portion of the substrate is disposed between the second recesses and the third recesses;
   forming an epitaxial semiconductor material over the first side of the substrate and over the first recesses, the second recesses, and the third recesses;
   performing a thermal anneal process after forming the epitaxial semiconductor material, wherein after the thermal anneal process, the first recesses merge to form a first recess, the second recesses merge to form a second recess, and the third recesses merge to form a third recess;
   after performing the thermal anneal process, patterning the epitaxial semiconductor material to remove portions of the epitaxial semiconductor material, wherein after the patterning, a first portion of the epitaxial semiconductor material is disposed over the first portion of the substrate, a second portion of the epitaxial semiconductor material is disposed over the third recess, and a third portion of the epitaxial semiconductor material over the third recess forms a spring that attaches the second portion of the epitaxial semiconductor material to the substrate;
   forming a strain gauge on the first portion of the epitaxial semiconductor material; and
   forming a temperature sensor on the second portion of the epitaxial semiconductor material.

19. The method of claim 18, further comprising, after forming the strain gauge and the temperature sensor, forming a fourth recess that extends into the substrate from a second side of the substrate opposite to the first side of the substrate.

20. The method of claim 18, further comprising, after forming the strain gauge and the temperature sensor, attaching a cover to the first side of the substrate, wherein the strain gauge and the temperature sensor are disposed in an enclosed space between the cover and the first side of the substrate.

* * * * *